US006691464B2

United States Patent
Nestell et al.

(10) Patent No.: US 6,691,464 B2
(45) Date of Patent: Feb. 17, 2004

(54) VERTICAL SLIDER WINDOW ASSEMBLY

(75) Inventors: David E. Nestell, Spring Lake, MI (US); Darin J. Snider, Holland, MI (US); Loren Brent Renkema, Wyoming, MI (US); Jim Galer, Hudsonville, MI (US)

(73) Assignee: Donnelly Corporation, Holland, MI (US)

( * ) Notice: Subject to any disclaimer, the term of this patent is extended or adjusted under 35 U.S.C. 154(b) by 11 days.

(21) Appl. No.: 10/113,963

(22) Filed: Mar. 29, 2002

(65) Prior Publication Data

US 2003/0182865 A1 Oct. 2, 2003

(51) Int. Cl.[7] .................................................. B60J 1/16
(52) U.S. Cl. ........................................ 49/374; 49/380
(58) Field of Search .......................... 49/116, 380, 413, 49/372, 374, 377, 475.1; 296/146.15, 146.16

(56) References Cited

U.S. PATENT DOCUMENTS

| 2,714,035 A | 7/1955 | Limberg et al. ............... 296/44 |
| 2,747,921 A | 5/1956 | Hooverson et al. ............ 296/44 |
| 2,836,457 A | 5/1958 | Beerman et al. ............... 296/44 |
| 3,174,742 A | 3/1965 | Stelzer ......................... 268/124 |
| 3,333,362 A | 8/1967 | Kostin et al. .................. 49/248 |
| 3,706,163 A | 12/1972 | Pickles ......................... 49/362 |
| 3,770,312 A | 11/1973 | Shadburn ...................... 296/28 |
| 4,119,341 A | 10/1978 | Cook ........................... 296/146 |
| 4,124,054 A | 11/1978 | Spretnjak ..................... 160/90 |
| 4,170,847 A | 10/1979 | Pickies ......................... 49/349 |
| 4,182,078 A | 1/1980 | Bartholomew ................ 49/139 |
| 4,543,747 A | 10/1985 | Kaltz et al. .................... 49/249 |
| 4,671,013 A | 6/1987 | Friese et al. ................... 49/380 |
| 4,793,099 A | 12/1988 | Friese et al. ................... 49/380 |
| 4,874,201 A | 10/1989 | Scaglietti ..................... 296/201 |
| 4,920,698 A | 5/1990 | Friese et al. ................... 49/380 |
| 5,363,537 A | 11/1994 | Schneider et al. ............. 24/289 |
| 5,442,880 A | 8/1995 | Gipson ......................... 49/413 |
| 5,473,840 A | 12/1995 | Gillen et al. ................... 49/380 |
| 5,503,452 A * | 4/1996 | Moretz et al. ................. 296/224 |
| 5,505,023 A | 4/1996 | Gillen et al. ................... 49/380 |
| 5,542,214 A | 8/1996 | Buening ....................... 49/380 |
| 5,623,785 A | 4/1997 | Mariel ......................... 49/352 |
| 5,657,580 A | 8/1997 | Kobrehel ...................... 49/352 |
| 5,724,769 A | 3/1998 | Cripe et al. ................... 49/360 |
| 5,775,029 A | 7/1998 | Buening ....................... 49/360 |
| 5,784,832 A | 7/1998 | Lee Van ....................... 49/352 |
| 5,822,922 A | 10/1998 | Grumm et al. ................ 49/360 |
| 5,832,667 A | 11/1998 | Buening et al. ............... 49/212 |
| 5,836,110 A | 11/1998 | Buening ....................... 49/360 |
| 5,864,987 A | 2/1999 | Mariel et al. .................. 49/352 |
| 5,996,284 A | 12/1999 | Freimark et al. .............. 49/209 |
| 6,014,840 A | 1/2000 | Ray et al. ..................... 49/413 |
| 6,125,587 A * | 10/2000 | Woods ......................... 49/374 |
| 6,223,470 B1 | 5/2001 | Millard et al. ................ 49/374 |
| 6,260,905 B1 * | 7/2001 | Wagner ........................ 296/146.16 |

* cited by examiner

Primary Examiner—Jerry Redman (57) ABSTRACT

The present invention provides a vertical slider window system which integrates fixed panes and one and more sliding panes into an integrated unit that is easier to handle and install in an opening of a vehicle (such as the rear window or backlite of a pickup truck or similar style light truck vehicle) and, further, which seals the sliding pane.

27 Claims, 4 Drawing Sheets

VERTICAL SLIDER WINDOW ASSEMBLY

TECHNICAL FIELD AND BACKGROUND OF THE INVENTION

The present invention relates to a window assembly and, more particularly, to a window assembly with a vertically sliding pane.

Many trucks, such as pick-up trucks, on the market today offer back window assemblies with sliding panes that provide access to the bed of the truck from the passenger compartment. In addition, the position of the sliding pane can be adjusted to enhance the circulation of air through the vehicle cabin. Typically, such sliding window assemblies include a supporting structure that supports one or more fixed panes and one or more sliding panes, which are moved preferably using electro-mechanical systems.

The trend in vehicle windows is to form a pre-assembled modular assembly that can be installed as a single component. In addition, more recently, window assemblies are preferably retained in the vehicle by studs or clips that are encapsulated or otherwise attached to the window assembly. As a result, the window assembly comprises a pre-assembled unit that is easier to handle during shipping and installation. Examples of such pre-assembled units are shown in U.S. Pat. Nos. 4,606,159; 4,723,809; 5,853,895; 6,086,138; and 6,293,609, which are incorporated by reference herein in their entireties.

In vertical sliding window assemblies, and particularly in multiple window pane vertical window assemblies, such as commonly used as the rear window in a pickup truck and similar light truck vehicles, the mounting of the window assembly poses several additional challenges over fixed position window assemblies. In addition, when manufacturing a window assembly there can be numerous restrictions imposed on the shape and configuration of the window assembly and also on the performance of the window assembly—such as noise, air leakage, and water/moisture intrusion, which for various reasons the prior art has failed to achieve in vertical slider window assemblies. For example, the channels that are used to guide the sliding pane, such as in U.S. Pat. No. 6,223,470, impose additional loads and demands on the supporting structure that supports the fixed panes. Perhaps for these reasons and other reasons, the seal in the lower portion of these types of vertical sliding window assemblies, which seals the sliding pane, may lose its effectiveness over time.

In addition, given the different space requirements and configurations of rear window assemblies, vehicle manufacturers have typically provided different body panel configurations for fixed pane window assemblies, horizontal slider window assemblies, and vertical slider window assemblies. However, this has increased the cost of vehicles and, further, limited the type of window assembly that can be mounted in the vehicle once the body panel configuration has been chosen.

Hence, for these and other reasons, there is a need for a simplified vertical sliding widow assembly unit that can be mounted in the same opening as a horizontal slider window assembly and a fixed window assembly to decrease the cost of vehicles incorporating such rear window assemblies and, further, increase window type options for the vehicle manufacture when assembling vehicles in the vehicle assembly line. Furthermore, there is a need for a window assembly that can integrate one or more fixed panes and a sliding pane, and its supporting structure, into a single unit that is easier to handle and install while minimizing the weight of the assembly and, further, which will meet or exceed industry standards for noise, air leakage, and water intrusion.

SUMMARY OF THE INVENTION

Accordingly, the present invention provides a vertical slider window system which integrates a pair of fixed panes and at least one sliding pane into an integrated unit that is easier to handle and install in an opening of a vehicle (such as the rear window or backlite of a pickup truck or similar style light truck vehicle) and, further, which seals the sliding pane to meet or exceed the industry standards for noise, air leakage, and water intrusion.

In one form of the invention, a vertical slider window assembly includes a first fixed pane, a second fixed pane, and a sliding pane. The window assembly further includes a support, such as a frame, for holding the first and second fixed panes in a spaced relationship to thereby define an opening of the window assembly therebetween. The support includes vertical tracks for guiding the sliding pane between an open position and a closed position. The support preferably comprises a reinforcing member at least partially encapsulated in a polymeric material, and, further, includes a seal that provides sealing engagement with the exterior surface of the sliding pane. In addition, the reinforcing member is preferably substantially aligned with the seal to enhance the sealing engagement of the seal with the exterior surface of the sliding pane when the sliding pane is moved to its closed position.

In one aspect, the seal comprises a Y-shaped seal.

In other aspects, the support comprises spaced horizontal members and spaced vertical members, with the spaced horizontal members being interconnected by the spaced vertical members to thereby define the opening of the window assembly. Preferably, the vertical members include the tracks for guiding the sliding pane between its closed position and its open position.

In other aspects, the support includes exterior surfaces that extend between the fixed panes and that are generally flush with the exterior surfaces of the first and second panes. In preferred form, the peripheral edges of the fixed panes are substantially free of attachment to the support to thereby form a flush window assembly for mounting in a vehicle. As a result, the window assembly has an appearance of "floating" in the vehicle body.

In another form of the invention, a vertical slider window assembly includes a first fixed pane, a second fixed pane, and a sliding pane. The window assembly further includes a support, such as a frame, which holds the first and second fixed panes in a spaced relationship to thereby define an opening therebetween. The support includes vertical tracks for guiding the sliding pane between a closed position to an open position. The tracks are angled with respect to the first and second fixed panes whereby the sliding pane moves in a plane offset from a plane defined by the first and second fixed panes. The support also preferably has exterior surfaces extending between the fixed panes above and below the opening, which are generally flush with the exterior surfaces of the first and second fixed panes. In this manner, the opening of the window assembly is framed by the fixed panes and the support. The peripheral edges of the fixed panes are preferably substantially free of attachment to the support to thereby form a flush window assembly for mounting in a vehicle so that the fixed panes have an appearance of "floating" in the vehicle body opening.

In one aspect, the support preferably comprises a reinforcing member at least partially encapsulated in a polymeric material. The support includes a seal for sealing against an outer lower surface of the sliding pane, with the reinforcing member being substantially aligned with the seal to provide increased stiffness in the support at the seal and, hence, provide a more effective seal with the sliding pane. In a further aspect, the seal preferably comprises a Y-shaped seal.

In further aspects, the support comprises spaced horizontal members and spaced vertical members, with the spaced horizontal members being interconnected by the spaced vertical members to thereby define the opening. For example, the vertical members include the tracks for guiding the sliding pane between the closed position and the open position. In addition, the tracks are preferably angled with respect to the first and second fixed panes whereby the sliding pane moves in a plane offset from a plane defined by the first and second fixed panes.

According to yet a further aspect, the support preferably includes a peripheral portion that extends along an inner surface of the fixed panes around the upper, lower, and side peripheral portions of the first and second fixed panes.

In another form of the invention, a vertical sliding window assembly includes a first fixed pane, a second fixed pane, and a sliding pane, as noted above, and a support, which holds the fixed panes and includes spaced horizontal members and spaced vertical members, with the spaced horizontal members being interconnected by the spaced vertical members to thereby define an opening of the window assembly. The vertical members include vertical tracks for guiding the sliding pane between a closed position in which the opening is closed to an open position. The tracks are preferably angled with respect to the first and second fixed panes whereby the sliding pane moves in a plane offset from a plane defined by the first and second fixed panes. The support also has exterior surfaces extending between the fixed panes above and below the window assembly opening, which are generally flush with the exterior surfaces of the first and second fixed panes. In this manner, the window opening is framed by the support and the fixed panes. In order to provide a flush window assembly, at least the upper, lower and outer side peripheral edges of the fixed panes are preferably substantially free of attachment to the support.

In one form, the lower horizontal member comprises a reinforcing member at least partially encapsulated in a polymeric material, which supports a seal for sealing against an outer surface of the sliding pane. Preferably, the reinforcing member is substantially aligned with the seal to provide increased stiffness in the lower horizontal member at the seal to enhance the sealing engagement of the sliding pane.

In a further aspect, the support includes a peripheral portion at the inner surface of the fixed panes around the upper, lower, and side peripheral portions of the first and second fixed panes, which provides a mounting surface for the window assembly in the vehicle body. The peripheral portion of the support may have one or more fasteners or studs to at least assist in the mounting window of the assembly in the vehicle body opening.

It can be appreciated that the present invention provides an improved slider window assembly with a support that integrates one or more fixed panes and one or more sliding panes in a manner that results in an integrated unit that can be quickly and easily in an opening of a vehicle. In addition, the support provides an improved seal at the sliding pane's lower portion by incorporating reinforcement in the support substantially aligned with the seal location. Furthermore, the support preferably integrates the fixed panes in a manner so that the fixed panes appear to be floating and are preferably substantially free of attachment to the support along their upper, lower, and outer side peripheral edges.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figure 1:
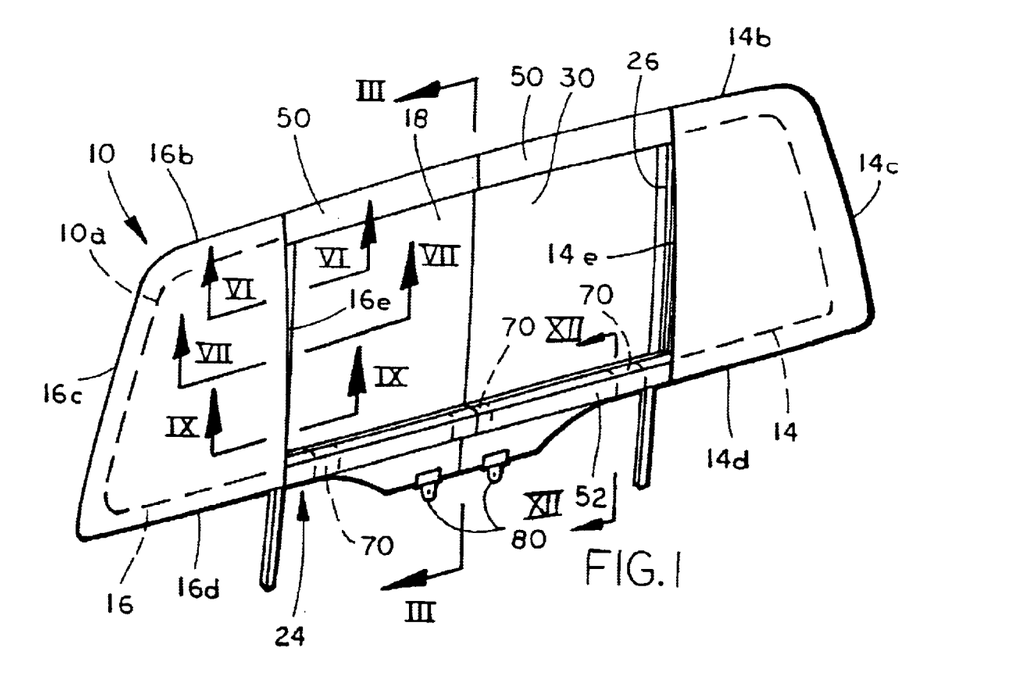
FIG. 1 is a front elevation view of a vertical slider window assembly of the present invention.

Referring to FIG. 1, the numeral 10 generally designates a vertical slider window assembly of the present invention. Vertical slider window assembly 10 incorporates a support 12 that integrates one or more fixed panes with a sliding pane as a window assembly unit so that the window assembly can be manufactured at a window assembly plant that is located remotely from a vehicle assembly plant. Furthermore, since the window assembly is supplied as a unit, it can be handled more easily, especially during installation at the vehicle assembly plant, where the window assembly unit is mounted in an opening or recess in the vehicle body. In addition, support 12 preferably provides a flush mounting of window assembly 10 in the vehicle body.

Figure 2:
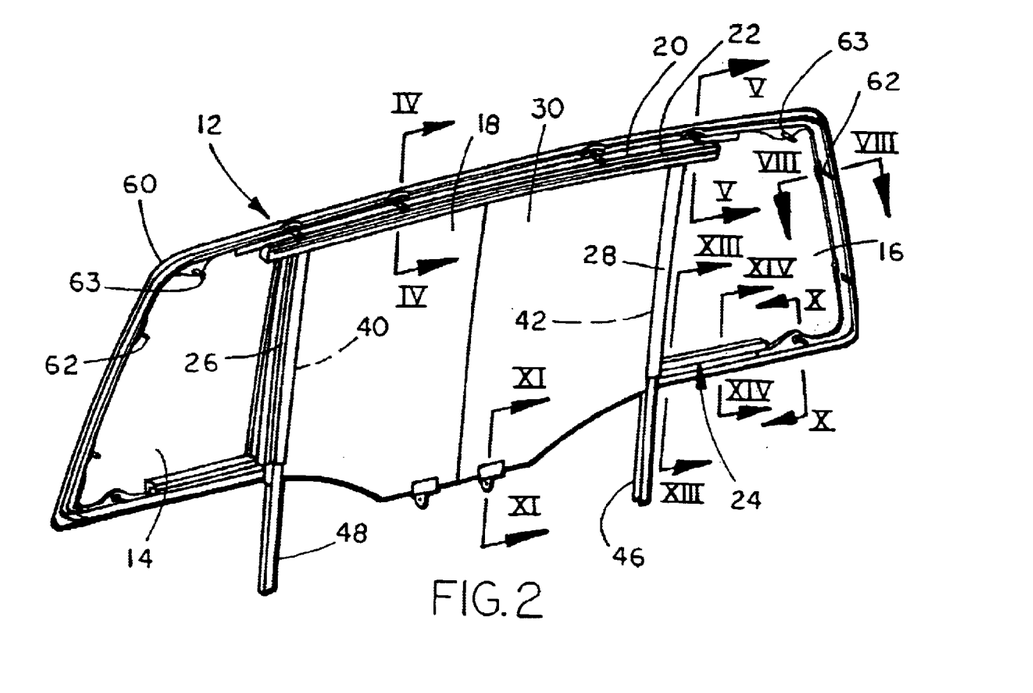
FIG. 2 is a rear elevation view of the window assembly of FIG. 1.

As best seen in FIG. 2, support 12 holds a first fixed pane 14, a second fixed pane 16, and at least one sliding pane 18, which is mounted for vertical movement in support 12, as will be more fully described below. Panes 14, 16, and 18 may comprise glass or plastic panes and, further, may be transparent or tinted. Support 12 is configured to integrate panes 14, 16, and 18 in a manner such that window assembly 10 may be mounted in a vehicle body opening as an integrated unit and, further, in a manner to permit sliding pane 18 to move from a closed position to a fully open position such that the opening between fixed panes 14 and 16 is maximized. In addition, when in its closed position pane 18 is sealed in support 12 to minimize noise, air leakage and water/moisture intrusion into the vehicle in which the window assembly is mounted, as will be more fully described below. Furthermore, support 12 and panes 14, 16, and 18 are configured such that window assembly 10 may be mounted in a vehicle body opening that is configured to receive a fixed pane window assembly or a horizontal slider window assembly to thereby.

Referring to FIG. 2, support 12 preferably comprises a frame and, more preferably, a molded frame formed, for example, from a rigid polymer or plastic, such as a thermoplastic or a reaction injection molding polyurethane, including materials such as polyethylene terephthalate (PET), polypropylene, nylon, including a reinforced nylon, acrylonitrile-butadeine-styrene (ABS), polycarbonate terephthalate (PC/PBT), or thermoplastic urethane (TPU). However, support 12 may be formed from another formable rigid material, including metal, without affecting the scope of the present invention. Support 12 includes reinforcing members (described more fully below) at least partially, and more preferably, substantially encapsulated therein, which provide stiffness to support 12 so that window assembly 10 can be installed as a unit and further to provide support to sliding pane 18 in a manner that enhances the sealing engagement of the sliding pane and seal at the window opening when sliding pane 18 is moved to its closed position to minimize noise, heat loss, and water intrusion through the opening.

Fixed panes 14 and 16 are shown generally in the shape of a generally trapezoidal shaped pane and include upper peripheral edges 14b, 16b, outer peripheral edges 14c, 16c, lower peripheral edges 14d, 16d, and inner peripheral edges 14e, 16e. However, fixed panes 14 and 16 may be substantially rectangular-shaped or triangular-shaped, or other shape depending on the application, without affecting the scope of the present invention. A ceramic frit layer 10a or other known coating is preferably applied to the inner surfaces of fixed panes 14 and 16 along their perimeter edges thereof. The frit layer 10a is opaque and functions to facilitate adhering or bonding of the support 12 to fixed panes 14 and 16, while also improving the overall appearance of the window, since the bonding surfaces are then not visible from the exterior of the window when the window assembly is mounted in a vehicle.

As best seen in FIG. 2, support 12 includes a central frame assembly 20 that includes an upper horizontal member 22 and a lower horizontal member 24 and vertical members 26 and 28, which together with the central portions of upper and lower horizontal members 22 and 24 define a central opening 30, which is opened and closed by sliding pane 18. Preferably, upper and lower horizontal members 22 and 24 and vertical members 26 and 28 are integrally molded as a unit and post attached to the fixed panes, using an adhesive as described below. As best understood from FIGS. 1–3, lower horizontal member 24 extends between fixed panes 14 and 16 below opening 30 and, as will described in greater detail below, includes a seal 32 (FIG. 3) for sealing against the outer or exterior surface of sliding pane 18.

Figure 3:
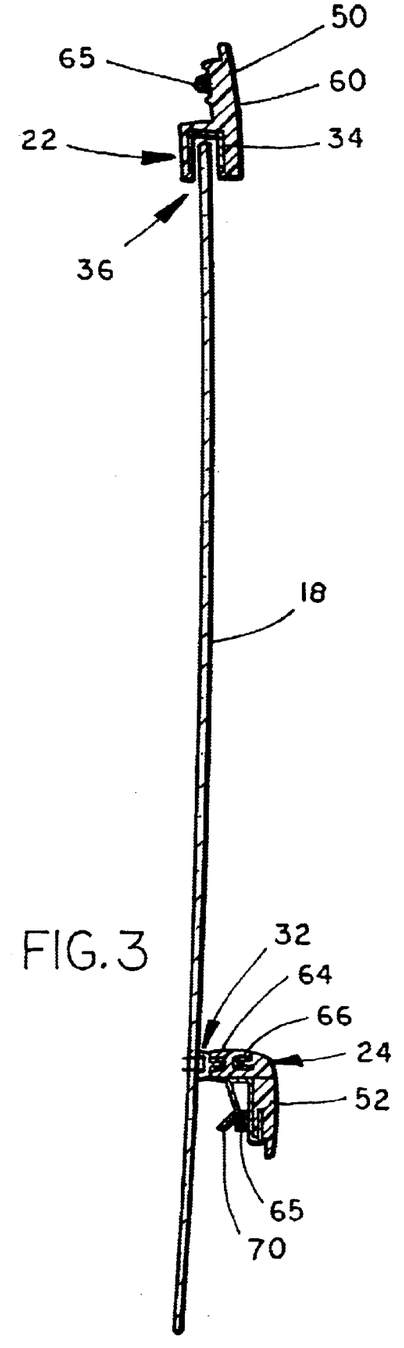
FIG. 3 is a cross-section view taken along line III—III of FIG. 1.
Figure 4:
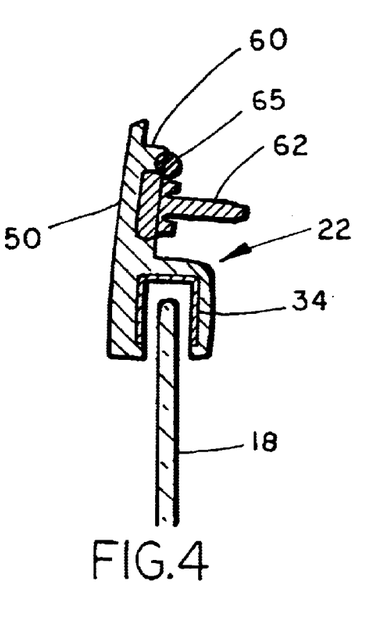
FIG. 4 is a cross-section view taken along line IV–IV of FIG. 2.
Figure 5:
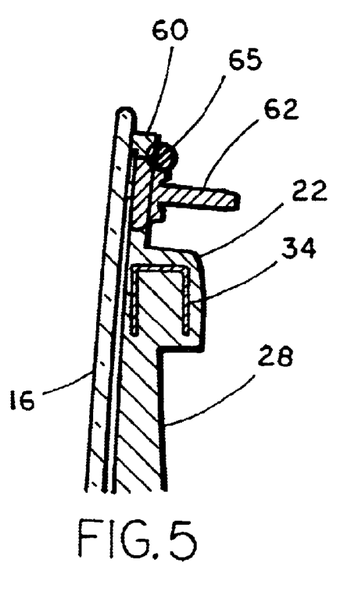
FIG. 5 is a cross-section view taken along line V—V of FIG. 2.

As best seen in FIG. 3, upper horizontal member 22 includes a rigid channel-shaped member 34 encapsulated therein to define an upper track 36 into which the upper edge of sliding pane 18 extends to close opening 30 when sliding pane 18 is moved to its closed position. Channel-shaped member 34 preferable comprises a metal channel-shaped member. Preferably, positioned in track 36 is a seal (not shown) to seal against the upper edge of sliding pane 18 when pane 18 is moved to its closed position. The seal preferably comprises an EPDM or SANTAPRENE® seal or the like and may comprise a U-shaped seal, a double-L seal, a Y-shaped seal, a bulbous seal, or numerous other shaped seals. Optionally, the seal is slip coated to reduce the wear on the seal and the driving mechanism, as is known in the art. Sliding pane 18 is guided between its closed position and open positions in vertical tracks 40 and 42 that are provided in vertical members 26 and 28.

Figure 6:
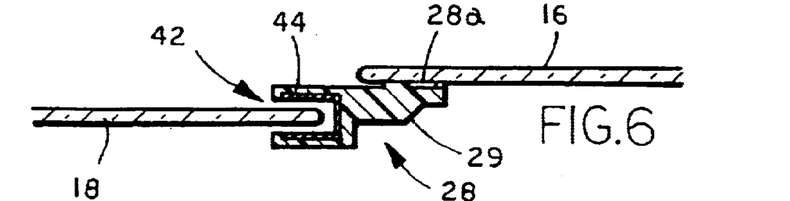
FIG. 6 is a cross-section view taken along line VI—VI of FIG. 1.
Figure 7:
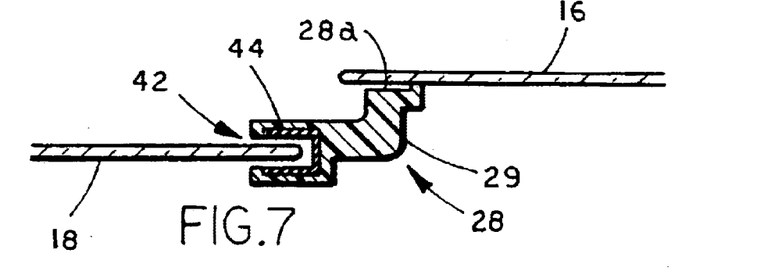
FIG. 7 is a cross-section view taken along line VII—VII of FIG. 1.
Figure 8:
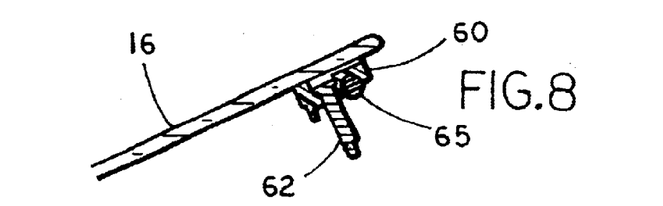
FIG. 8 is a cross-section view taken along line VIII—VIII of FIG. 2.
Figure 9:
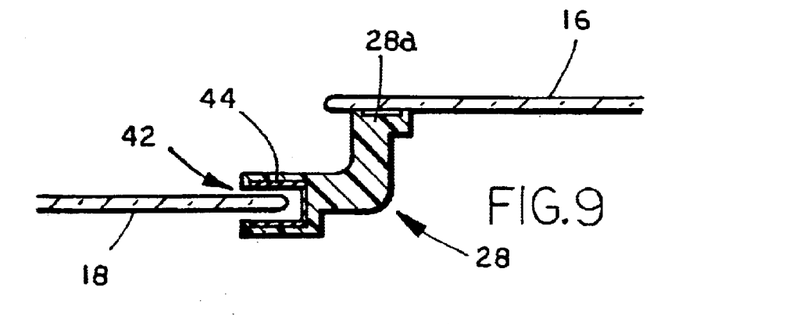
FIG. 9 is a cross-section view taken along line IX—IX of FIG. 1.
Figure 10:
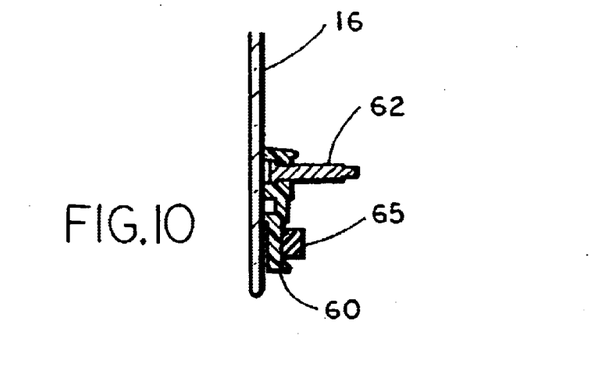
FIG. 10 is a cross-section view taken along line X—X of FIG. 2.

As best seen in FIGS. 6, 7, and 9, vertical member 28 includes a generally rigid channel-shaped member 44 encapsulated therein to define a first vertical track 42, for guiding one side of pane 18. Vertical member 26 similarly includes a rigid channel-shaped member 48 encapsulated therein to define a second vertical track 40 for guiding the other side of pane 18. Members 44 and 48 preferably comprise metal channel-shaped members that extend from upper horizontal member 22 and to below lower horizontal member 24 to provide support for sliding pane 18 preferably over its full range of motion when it is moved between its closed position (shown in FIG. 2) and its open positions in which sliding pane 18 extends into the vehicle body below lower horizontal member 24. It should be understood that members 44 and 48 may be formed from other rigid materials such as a composite material, including a reinforced plastic. Seals are also positioned in tracks 40 and 42 to seal against sliding pane 18, which also preferably comprise an EPDM or SANATPRENE® seal or the like and may comprise bulbous seals, C or U-shaped seals, Y-shaped seals, double-L seals or numerous other shaped seals similar to the seal in track 36. The seals in tracks 40 and 42 are also optionally slip coated.

In the illustrated embodiment, vertical members 26 and 28 are a mirror image of each other and, therefore, hereinafter, reference will be made to vertical member 28 only. Though it should be understood the vertical members 26 and 28 may not be mirror images of each other and yet still provide the same guiding and supporting function described below. Vertical member 28 includes a flange 29 that projects outwardly from the channel-shaped body of vertical support 28 and includes a mounting surface 28a for fixed pane 16, which is offset from track 42 so that fixed panes 14 and 16 are offset from sliding pane 18. Furthermore, as best seen in FIG. 2, the channel-shaped bodies or tracks 40 and 42 of vertical supports 26 and 28 are angled with respect to fixed panes 14 and 16 such that sliding pane 18 is similarly angled with respect to fixed panes 14 and 16. In the illustrated embodiment, tracks 40 and 42 are angled by increasing the cross-sectional width of the flange along the length of vertical member 28, which causes the mounting surface 28a offset to increase over the length of vertical member 28. In other words, the distance between mounting surface 28a and track 42 increases over the length of the vertical member with the greatest separation distance provided at the lower end of vertical member 28. As a result, sliding pane 18 maintains its generally vertical orientation, while fixed panes 14 and 16 generally follow the bow or curvature of the vehicle body. Preferably, the respective mounting surfaces of vertical members 26 and 28 are recessed to accommodate an adhesive, such a urethane adhesive, which is used to mount the respective fixed panes to vertical members 26 and 28. For examples of suitable adhesives and primer materials which may be employed, reference is made to U.S. Pat. Nos. 5,544,458; 5,591,528; 5,611,180; 5,807,515; 5,864,966; 6,089,646;

6,086,138; and 6,068,719, all of which are commonly owned by Donnelly Corporation of Holland, Mich. and are herein incorporated by references in their entireties.

Referring again to FIGS. 1 and 3, upper and lower horizontal members 22 and 24 include an enlarged section or flange with an exposed exterior surface 50, 52, which are positioned between fixed panes 14 and 16. Exposed exterior surfaces 50 and 52 are preferably generally flush with the exterior surfaces of fixed panes 14 and 16 to provide a generally flush window assembly, with the exception of sliding pane 18, which is offset inwardly to permit sliding pane 18 to be retracted behind horizontal member 24 and into the body of the vehicle. As a result, exposed exterior surfaces 50 and 52 together with fixed panes 14 and 16 frame opening 30.

Referring again to FIG. 2, support 12 preferably includes a perimeter portion 60 that is mounted to the inner surface of fixed panes 14 and 16 and extends around the outer peripheral portions of fixed panes 14 and 16. Preferably, perimeter portion 60 along with upper and lower horizontal members are adhered to the inner surface of panes 14 and 16 and, thus, comprise a single-sided support. As a result, edges 14b, 16b, 14c, 16c, 14d, 16d, 14e, and 16e are substantially free of attachment to support 12. As a result, window assembly 10 has the appearance of "floating" in the vehicle body opening.

Peripheral portion 60 is formed, such as by molding, with horizontal and vertical members 22, 24, 26, and 28 and so that members 22, 24, 26, and 28 are also integral with peripheral portion 60. In addition, peripheral portion 60 includes molded therein a plurality of fasteners 62 and locators 63 for securing window assembly 10 and guiding window assembly on to the body of the vehicle. In preferred form, window assembly 10 is mounted to the vehicle body by an acetyl rope or tape 65 which extends substantially around the entire periphery of window assembly 10 on support 12 and together with fasteners 62 secure window assembly 10 to the vehicle body. However, it can be appreciated that a urethane adhesive can also be used. In which case, the fasteners may be eliminated provided clips or other means are used to hold the window assembly in place while the urethane adhesive cures.

Referring to FIGS. 4, 5, 8, and 10, fasteners 62 are encapsulated in peripheral portion 60, while locators 63 are molded from the plastic forming the peripheral portion and are, therefore, formed with the peripheral portion. For examples, of suitable methods of forming encapsulated fasteners or the like, reference is made to U.S. Pat. Nos. 5,853,895; 5,822,932; 6,086,138; 5,707,473; and 5,807,515, which are commonly owned by Donnelly Corporation of Holland, Mich. and which are herein incorporated by reference in their entirety.

As previously noted, lower horizontal member 24 includes a seal 32. Seal 32 is positioned in a longitudinal recess or groove 64 formed in an inwardly facing side of horizontal member 24. In the illustrated embodiment, seal 32 preferably comprises a Y-shaped seal with a base (which is held in groove 64 either by a compression fit and/or by an adhesive) and a pair of projecting flanges that seal against outer surface of pane 18. Seal 32 may comprise an injection molded seal, for example a seal molded from SANTAP-RENE® brand polymeric material available from Monsanto Corporation or may be formed from other materials, including EPDM. Furthermore, as noted above, seal 32 may be slip coated and may comprise bulbous seals, V-shaped seals, C or U-shaped seals, double-L seals, or any one of a number of different shapes. In addition, seal 32 may comprise a unitary seal with the seals in tracks 36, 40, and 42 which together form a generally A-shaped unitary seal, similar to the H-shaped seal disclosed in U.S. corresponding patent application entitled POWER SLIDER WINDOW ASSEMBLY, Ser. No. 09/638,433, filed Aug. 14, 2000, which is incorporated by reference herein in its entirety.

As noted previously, support 12 includes a reinforcing member or stiffening element, such as channel-shaped member 66, which provides rigidity to horizontal member 24. In addition, channel-shaped member 66 is at least generally aligned with groove 64 and seal 32 so that the local stiffness of horizontal member 24 at seal 32 is increased such that deflection of horizontal member 24 is significantly reduced at seal 32; thus, providing an enhanced seal with pane 18 to reduce air leakage, noise, and water/moisture intrusion through opening 30 when sliding pane 18 is moved to its closed position. Furthermore, as will be fully described below in reference to mounting clip 70, the configuration of lower horizontal member 24 is such that when window assembly 10 is mounted in a vehicle, the loads transferred to horizontal member 24 generally pass through reinforcing member 66 to minimize torsional loads on the reinforcing member thereby further reducing the deflection at seal 32 and further enhancing the seal at the sliding pane.

Figure 12:
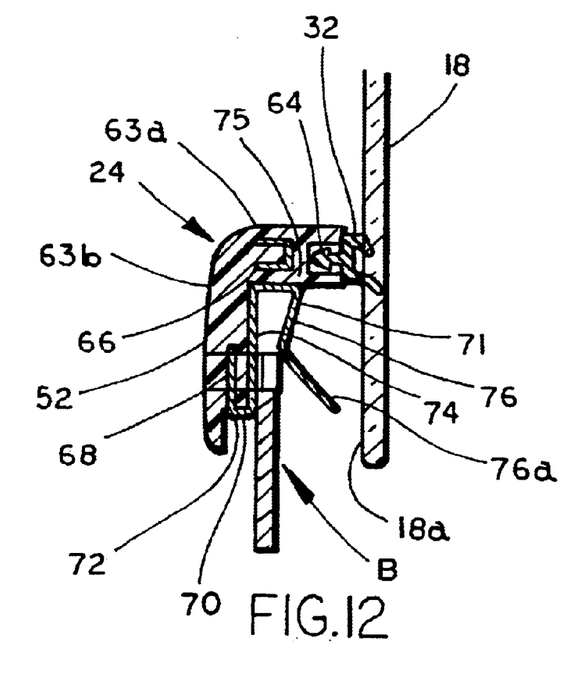
FIG. 12 is a cross-section view taken along line XII—XII of FIG. 1.
Figure 13:
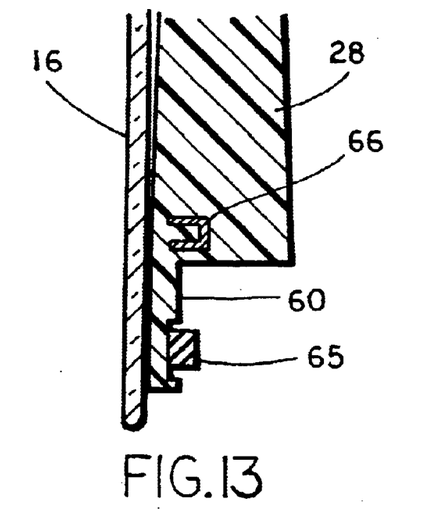
FIG. 13 is a cross-section view taken along line XIII—XIII of FIG. 2.
Figure 14:
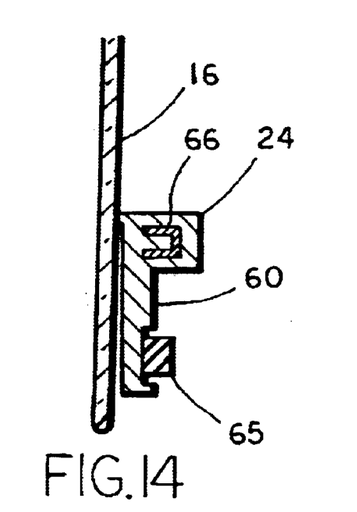
FIG. 14 is a cross-section view taken along line XIV—XIV of FIG. 2.

Referring to FIG. 12, central portion of horizontal member 24 includes a generally inverted L-shaped cross-section and includes an upper horizontal leg portion 63a and a vertical-leg portion 63b. Horizontal-leg portion 63a includes longitudinal groove 64 for receiving seal 32, which seals against sliding pane 18 on its outer surface 18a. Vertical-leg portion 63b defines exterior surface 52 and, further, includes a second groove 68, which extends into leg portion 63b at its lower end for receiving a mounting clip 70. Mounting clip 70 comprises a guidance clip for assisting in the installation of window assembly 10 in an opening in the body of the vehicle.

As best seen in FIG. 12, guidance clip 70 has a generally inverted U-shaped body 71 with an upwardly extending lip 72, that is positioned in groove 68. U-shaped body 71 includes an upper portion 75 with downwardly depending portions that define a first leg 74 and a second leg 76 that is spaced from the first leg and which includes a lower portion 76a that is bent in an outward direction to form a guide surface to guide window assembly 10 over body portion B of the vehicle. In addition, lower portion 76a forms a spring such that when lower portion 76a is urged away from leg 74, the separation force will create a spring force in leg portion 76 to releasably secure window assembly 10 to body portion B. The upward reaction force of body part B on clip 70 maintains clip 70 in groove 68.

In addition, the upward reaction force on clip 70 is through upper portion 75, which bears up against the lower surface of horizontal leg 63a of horizontal member 24. Furthermore, the upward force is generally aligned with reinforcing member 66 so that the upward reaction force induces minimal, if any, torsional loads on lower horizontal member 24 or reinforcing member 66. Therefore, lower horizontal member 24 will exhibit minimal deflection when window assembly 10 is mounted in a vehicle, hence further enhancing the seal between frame 12 and sliding pane 18.

Figure 11:
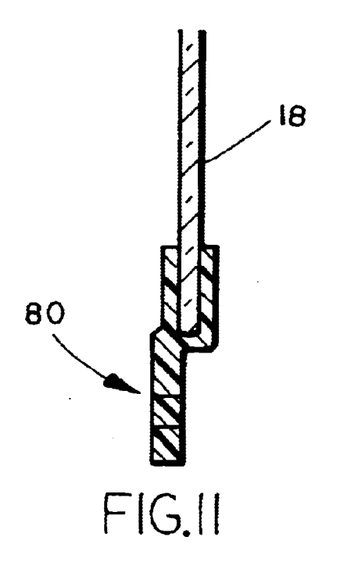
FIG. 11 is a cross-section view taken along line XI—XI of FIG. 2.

In the illustrated embodiment, window assembly 10 includes three clips 70 to mount window assembly 10 onto body portion B; however, it can be appreciated that the number of clips may be increased or decreased as desired. Referring to FIGS. 1, 2, and 11, sliding pane 18 includes one or more clips 80 which provide an attachment means for mounting the driver or drivers to sliding pane 18. However, it can be appreciated, that pane 18 may be manually moved between their closed and open positions and may incorporate a latching mechanism to lock the sliding window pane in its closed position or positions.

Accordingly, the present invention provides a window assembly that can be installed as an integrated unit in the body of a vehicle. The window assembly preferably has a generally flush mounting arrangement wherein the upper, lower, and both side peripheral edges of fixed panes 14 and 16 are substantially exposed and free of attachment to support 12 to create a "floating" appearance of the window when mounted in the vehicle body. However, it can be appreciated that the concepts of this invention may be incorporated into window assemblies that incorporate support systems that are two-sided or three-sided, as is known in the art. Furthermore, the support provides an improved seal against the sliding pane to reduce noise, air leakage, and water/moisture penetration into the vehicle when the sliding pane is in its closed position. In addition, support 12 provides sufficient stiffness to the components forming window assembly 10 so that window assembly 10 can be handled as a unit and quickly and easily installed in a body of a vehicle; thus, saving time and reducing costs. Additionally, with the present window assembly configuration, window assembly 10 may be mounted in a vehicle body that has an opening configured to receive all three types of window openings, namely fixed windows, horizontal slider windows, and vertical slide windows. Thus, providing greater flexibility to vehicle manufacturers.

While several forms of the invention have been shown and described, other forms will now be apparent to those skilled in the art. For example, while opening 30 is preferable centrally located, opening 30 may be offset both along the horizontal axis of the window assembly and along the vertical axis of window assembly. In addition, although the seals are described as separate seals, which are typically push fit onto support 12 of window assembly 10, it is further envisioned that one or more seals may be combined as a single seal and/or integrally molded with the support. For example, the support 12 and, for example, seal 32 may be molded in a two-shot or three-shot molding process or may be integrally formed by two separate molds. This approach provides a window assembly with lower assembly costs. In addition, the concepts of this invention may be used in a window assembly that has no fixed panes. Suitable applications would include vehicles with substantially rectangular openings; though it should be understood that the rails supporting the sliding pane may be angled to suit non-rectangular window openings as well.

Therefore, it will be understood that the embodiments shown in the drawings and described above are merely for illustrative purposes, and are not intended to limit the scope of the invention, which is defined by the claims that follow as interpreted under the principles of patent law including the doctrine of equivalents.

The embodiments of the invention in which an exclusive property right or privilege is claimed are defined as follows:

1. A vertical sliding window assembly comprising:
   a first fixed pane having an exterior surface;
   a second fixed pane having an exterior surface;
   a sliding pane;
   a support for holding said first and second fixed panes in a spaced relationship to thereby define an opening of said window assembly therebetween, said support including vertical tracks for guiding said sliding pane between an open position and a closed position, said support comprising a reinforcing member at least partially encapsulated in a polymeric material, said support including a seal for sealingly engaging an exterior surface of said sliding pane, and said reinforcing member increasing the stiffness of said support and being substantially aligned with said seal to enhance the sealing engagement of said seal with said exterior surface of said sliding pane.

2. The sliding window assembly of claim 1, wherein said seal comprises a Y-shaped seal.

3. The sliding window assembly of claim 1, wherein said support comprises spaced horizontal members and spaced vertical members, said spaced horizontal members being interconnected by said spaced vertical members to thereby define said opening.

4. The sliding window assembly of claim 3, wherein said support includes exterior surfaces extending between said fixed panes, said exterior surfaces of said support being generally flush with said exterior surfaces of said first and second fixed panes, and said peripheral edges of said fixed panes being substantially free of attachment to said support to thereby form a flush window assembly for mounting in a vehicle.

5. The sliding window assembly of claim 4, wherein said exterior surfaces are positioned above and below said opening.

6. The sliding window assembly of claim 3, wherein said vertical members includes said tracks for guiding said sliding pane between said closed position and said open position.

7. The sliding window assembly of claim 6, wherein said tracks are angled with respect to said first and second fixed panes whereby said sliding pane moves in a plane offset from a plane defined by said first and second fixed panes.

8. The sliding window assembly of claim 1, wherein said opening comprises a central opening.

9. The sliding window assembly of claim 1, wherein said support includes a peripheral portion extending along an inner surface of said fixed panes around upper, lower, and side peripheral portions of said first and second fixed panes.

10. The sliding window assembly of claim 1, wherein said seal provides sealing engagement of said exterior surface of said sliding pane at a lower end of said opening.

11. A vertical sliding window assembly comprising:
   a first fixed pane having peripheral edges and an exterior surface;
   a second fixed pane having peripheral edges and an exterior surface;
   a sliding pane;
   a support having spaced horizontal members and spaced vertical members, said spaced horizontal members being interconnected by said spaced vertical members to thereby define an opening of said window assembly, said fixed panes mounted to said support on either side of said opening, at least one of said vertical members including a vertical track for guiding said sliding pane between a closed position and an open position, said track being angled with respect to said first and second fixed panes whereby said sliding pane moves in a plane offset from a plane defined by said first and second fixed panes, and said support having exterior surfaces extending between said fixed panes and being generally flush with said exterior surfaces of said first and second fixed panes, and said peripheral edges of said fixed panes being substantially free of attachment to said support to thereby form a flush window assembly for mounting in a vehicle.

12. The sliding window assembly of claim 11, wherein one of said horizontal members comprises a reinforcing member at least partially encapsulated in a polymeric material, said one of said horizontal members including a seal for sealing engagement with an exterior surface of said sliding pane, and said reinforcing member being substantially aligned with said seal to enhance the sealing engagement of said exterior surface of said sliding pane.

13. The sliding window assembly according to claim 12, wherein said lower horizontal member includes said seal.

14. The sliding window assembly of claim 13, wherein said seal comprises a Y-shaped seal.

15. The sliding window assembly of claim 12, wherein said support includes a peripheral portion extending along an inner surface of said fixed panes around upper, lower, and side peripheral portions of said first and second fixed panes.

16. The sliding window assembly of claim 11, wherein said exterior surfaces of said support are positioned above and below said opening.

17. The sliding window assembly of claim 11, wherein said opening comprises a central opening.

18. A vertical sliding window assembly comprising:
   a first fixed pane having upper, lower, right and left side peripheral edges;
   a second fixed pane having upper, lower, right, and side peripheral edges;
   a sliding pane;
   a support holding said first and second fixed panes in a spaced relationship to thereby define an opening of said window assembly, said support including at least one vertical track for guiding said sliding pane between a closed position and an open position, said track being angled with respect to said first and second fixed panes whereby said sliding pane moves in a plane offset from said first and second fixed panes, and said support having exterior surfaces extending between said fixed panes and being generally flush with said exterior surfaces of said first and second fixed panes, and said upper, lower, right and left side peripheral edges of said fixed panes being substantially free of attachment to said support to thereby form a flush window assembly for mounting in a vehicle.

19. The sliding window assembly of claim 18, wherein said support comprises a reinforcing member at least partially encapsulated in a polymeric material, said support including a seal for sealing engagement with an exterior surface of said sliding pane, and said reinforcing member being substantially aligned with said seal to enhance said sealing engagement with said exterior surface of said sliding pane.

20. The sliding window assembly of claim 19, wherein said seal comprises a Y-shaped seal.

21. The sliding window assembly according to claim 19, wherein said support holds said seal.

22. The sliding window assembly of claim 19, wherein said support comprises spaced horizontal members and spaced vertical members, said spaced horizontal members being interconnected by said spaced vertical members to thereby define said opening.

23. The sliding window assembly of claim 22, wherein one of said vertical members includes said track for guiding said sliding pane between said closed position and said open position.

24. The sliding window assembly of claim 23, wherein said track comprises a channel-shaped member encapsulated in said one of said vertical members.

25. The sliding window assembly of claim 18, wherein said exterior surfaces of said support are positioned above and below said opening.

26. The sliding window assembly of claim 18, wherein said opening comprises a central opening.

27. The sliding window assembly of claim 18, wherein said support includes a peripheral portion extending along an inner surface of said fixed panes around upper, lower, and side peripheral portions of said first and second fixed panes.

* * * * *

UNITED STATES PATENT AND TRADEMARK OFFICE
CERTIFICATE OF CORRECTION

| | |
|---|---|
| PATENT NO. | : 6,691,464 B2 |
| APPLICATION NO. | : 10/113963 |
| DATED | : February 17, 2004 |
| INVENTOR(S) | : Nestell et al. |

It is certified that error appears in the above-identified patent and that said Letters Patent is hereby corrected as shown below:

<u>Column 3:</u>
Line 63, Insert --installed-- after "easily"

<u>Column 8:</u>
Line 40, Delete --,-- after "72"

Signed and Sealed this

Eighth Day of August, 2006

JON W. DUDAS
*Director of the United States Patent and Trademark Office*